Patented Jan. 12, 1932

1,840,335

UNITED STATES PATENT OFFICE

WILLIAM P. TER HORST, OF NITRO, WEST VIRGINIA, ASSIGNOR TO THE RUBBER SERVICE LABORATORIES CO., OF AKRON, OHIO, A CORPORATION OF OHIO

PROCESS OF MANUFACTURING TRIARYL PHOSPHATES

No Drawing. Application filed November 26, 1928. Serial No. 322,102.

This invention relates to the manufacture of triaryl phosphates and has for its object to provide an improved process whereby these aryl esters may be produced in a state of high purity and in an economical and efficient manner. More specifically, the present invention relates to the preparation of triaryl phosphates by an improved process whereby phosphorus oxychloride is reacted with a phenol in the presence of ultra violet light rays as a catalyst alone or as a component of a so-called mixed catalyst.

Heretofore, in the preparation of a triaryl phosphate by the reaction between a phenol and phosphorus oxychloride, the action was carried out in the absence of a catalyst, thereby requiring a long heating period at relatively high temperatures for the completion of the reaction or in the presence of the halides of metals such, for example, as the chlorides of magnesium, calcium, aluminum, iron, chromium and zinc.

It is now proposed, according to the present invention, to prepare a triaryl phosphate by reacting phosphorus oxychloride and a phenol while exposing the mixture to ultra violet light alone as a catalyst or in conjunction with other materials as a mixed catalyst.

The invention will be fully understood from the following examples.

One of the preferred class of compounds, for example triphenyl phosphate, was prepared in the following manner whereby a material was obtained which had a phenol content of less than 0.01%, 10 grams of which did not decolorize 10 c. c. of of N/100 potassium permanganate solution in forty-five minutes, and which had a corrected melting point higher than 50.1° C. or substantially between 50.3° C. and 50.7° C.

Approximately three molar portions (282 parts) of phenol and somewhat more than one molar portion (for example 160 parts) of phosphorus oxychloride were placed in a reactor suitably equipped to transmit ultra violet light and heated preferably for approximately 15 to 30 hours with agitation under the influence of ultra violet light rays at a temperature of preferably approximately 150 to 200° C. The triphenyl phosphate formed was isolated from the reaction product by distillation at reduced pressure. If preferable, however, the crude triphenyl phosphate may be isolated from the reaction product by crystallization from an organic solvent, for example xylene. The crude product was purified by any of the convenient methods of purification, for example by redistillation or recrystallization. Preferably, however, the crude triphenyl phosphate was redistilled at reduced pressure. The triphenyl phosphate thus prepared was obtained in nearly theoretical yield and of a high degree of purity. Other methods of further purification of the preferred product may be employed as hereinafter disclosed.

Another of the preferred methods of preparing triaryl phosphates from phosphorus oxychloride and a phenol comprises their reaction in the presence of a mixed catalyst. Thus, approximately three molar portions (282 parts) of phenol and somewhat more than one molar portion (for example 160 parts) of phosphorus oxychloride were placed in a reactor equipped with means to transmit ultra violet light to which was added substantially 0.1 to 5.0 parts of aluminum, preferably in the form of powder shavings and the like, and the mixture heated preferably at approximately 150 to 200° C. for about 15 to 30 hours with agitation under the influence of ultra violet light. On isolating the crude triphenyl phosphate formed preferably by distilling at reduced pressure, an exceptionally pure product was obtained in high yield. If convenient or desirable, however, other methods of isolating the triphenyl phosphate from the reaction product may be employed. Thus, the material may be allowed to crystallize from an organic solvent, for example xylene.

Further, it has been found that iodine either alone or in conjunction with ultra violet light constitutes an important catalyst for the preparation of triaryl phosphate. Thus, approximately three molar portions (282 parts) of phenol and somewhat more than one molar portion (160 parts) of phosphorus oxychloride were placed in a reactor equipped to transmit ultra violet light. Approximately one to five parts of iodine were added to the phenol-phosphorus oxychloride mixture which was then heated for about 15 to 30 hours at a temperature preferably of substantially 150 to 200° C. with agitation under the influence of ultra violet light. The method thus described, on isolation of the triaryl phosphate obtained by any of the convenient methods, for example by distilling the crude reaction product at a pressure below atmospheric pressure, produced a high yield of high grade material.

Another method for the preparation of the preferred type of compounds comprises the reaction between ortho phosphoric acid or its alkali metallic salts and halogen ring substituted benzene compounds. Thus, tripotassium phosphate was reacted with brombenzene preferably under pressures higher than atmospheric pressure in the presence of a catalyst comprising cuprous chloride, metallic copper and ultra violet light to form the desired triphenyl phosphate, which was isolated in the manner previously described.

Other phenols, for example cresol, react with phosphorus oxychloride in the manner illustrated in the examples hereinbefore given to form triaryl phosphates.

If convenient or desirable, the triaryl phosphate prepared according to the manner hereinbefore described may be further purified according to the following methods:

(a) Triphenyl phosphate is preferably recrystallized from an organic solvent, for example xylene, and then washed at a temperature of 0–5° C. with an alkali solution, for example sodium carbonate solution. Thus, substantially 1000 parts of triphenyl phosphate recrystallized as described is suspended in about 4000 parts of water containing approximately 20 parts of sodium carbonate at a temperature of approximately 0 to 5° C. and agitated for about one hour. The triphenyl phosphate was then filtered off and dried.

(b) Approximately 400 parts of triphenyl phosphate was suspended in about 1100 parts of water containing substantially 100 parts of a dilute oxidizing solution, for example 3% of hydrogen peroxide solution. The suspension was agitated for about one hour at room temperature, after which it was filtered and recrystallized from an organic solvent, for example xylol.

(c) Approximately 400 parts of triphenyl phosphate were added to about 2000 parts of water containing approximately 20 parts of dissolved borax. The suspension was agitated for about one hour at room temperature, after which the triphenyl phosphate was filtered off and recrystallized from an organic solvent, for example xylol.

(d) Approximately 500 parts of triphenyl phosphate were distilled in the presence of about 10 parts of litharge. The redistilled triphenyl phosphate was then preferably recrystallized from an organic solvent, for example xylol, and washed with an approximate one per cent. aqueous sodium carbonate solution.

(e) Approximately 200 parts of triphenyl phosphate were washed with a substantially one per cent. aqueous sodium carbonate solution. It was then dissolved in an organic solvent, for example toluene, substantially 10 parts of litharge added and the suspension allowed to stand for approximately 24 to 36 hours at 60° C. The litharge was then filtered off and the triphenyl phosphate allowed to crystallize, after which it was filtered off and dried.

The invention described is not limited to the exact temperatures, proportions and the like hereinbefore set forth but is limited solely by the claims attached hereto as part of this specification.

What is claimed is:

1. A process for the manufacture of a triaryl phosphate comprising the reaction between approximately three molar portions of a phenol and approximately one molar portion of phosphorus oxychloride at a temperature of from 150 to 200° C. in the presence of ultra violet light rays.

2. A process for the manufacture of a triaryl phosphate comprising the reaction between approximately three molar portions of a phenol and approximately one molar portion of phosphorus oxychloride at a temperature of from 150 to 200° C. in the presence of ultra violet light rays and aluminum as a catalyst.

3. A process for the manufacture of triphenyl phosphate comprising the reaction between approximately three molar portions of phenol and approximately one molar portion of phosphorus oxychloride at a temperature of from 150 to 200° C. in the presence of ultra violet light rays.

4. A process for the manufacture of triphenyl phosphate comprising the reaction between approximately three molar portions of phenol and approximately one molar portion of phosphorus oxychloride at a temperature of from 150 to 200° C. in the presence of ultra violet light and aluminum as a catalyst.

In testimony whereof I hereunto affix my signature.

WILLIAM P. ter HORST.